(12) United States Patent
McKee

(10) Patent No.: US 6,335,105 B1
(45) Date of Patent: Jan. 1, 2002

(54) CERAMIC SUPERALLOY ARTICLES

(75) Inventor: Douglas William McKee, Burnt Hills, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/336,971

(22) Filed: Jun. 21, 1999

(51) Int. Cl.⁷ .................... B32B 15/04; B32B 9/00; B05D 1/00

(52) U.S. Cl. .................... 428/623; 428/633; 428/472.2; 428/678; 428/680; 416/241 R; 416/241 B; 427/419.2; 427/419.7

(58) Field of Search .................... 428/615, 623, 428/632, 633, 668, 678, 679, 680, 469, 472, 472.2; 416/241 R, 241 B; 427/419.1, 419.2, 419.7

(56) References Cited

U.S. PATENT DOCUMENTS

| | | |
|---|---|---|
| 4,120,731 A | 10/1978 | Hillig et al. |
| 4,141,948 A | 2/1979 | Laskow et al. |
| 4,148,894 A | 4/1979 | Hillig et al. |
| 4,238,433 A | 12/1980 | Hillig et al. |
| 4,240,835 A | 12/1980 | Laskow et al. |
| 4,294,788 A | 10/1981 | Laskow et al. |
| 4,385,020 A | 5/1983 | Morelock |
| 4,737,328 A | 4/1988 | Morelock |
| 4,889,686 A | 12/1989 | Singh et al. |
| 4,931,311 A | 6/1990 | Singh et al. |
| 5,200,241 A | 4/1993 | Nied et al. |
| 5,683,825 A * | 11/1997 | Bruce et al. ............... 428/698 |
| 5,776,620 A | 7/1998 | Josso et al. |

FOREIGN PATENT DOCUMENTS

EP 783043 A1 7/1997

OTHER PUBLICATIONS

European Search Report.

* cited by examiner

*Primary Examiner*—Deborah Jones
*Assistant Examiner*—Bryant Young
(74) *Attorney, Agent, or Firm*—Noreen C. Johnson; Christian G. Cabou (57) ABSTRACT

An article includes a substrate formed of a superalloy, a silicon-based ceramic material and a thermally stable silicon diffusion barrier layer. The thermally stable diffusion barrier layer is intermediate to the substrate and ceramic material and prevents diffusion of silicon or carbon into the substrate. The diffusion barrier coating is any coating that is thermally stable and that prevents diffusion of silicon or carbon across a ceramic material:superalloy interface. In a method of forming an article, a superalloy substrate is formed, a thermally stable diffusion barrier layer is applied onto the substrate and a silicon-based ceramic material is supported by the barrier layer coated substrate. The diffusion barrier layer substantially prevents diffusion of silicon from the ceramic material into the superalloy substrate.

22 Claims, 14 Drawing Sheets

CERAMIC SUPERALLOY ARTICLES

BACKGROUND OF THE INVENTION

The invention relates to an article that includes a ceramic and a superalloy and to an article of manufacture that can be fabricated into a part for a gas turbine engine.

Power and efficiency of gas turbine engines typically increase with increasing operating temperature. However, the capability of a turbine engine to operate at increasingly higher temperature is limited by the ability of the turbine components particularly shrouds, vanes and blades, to withstand heat, oxidation and corrosion effects of an impinging hot gas stream.

Improved turbine components have been fabricated from strong stable substrate materials covered with thin protective coatings that resist oxidation and corrosion effects. Such substrates include nickel-based or cobalt based superalloy compositions. Insulative ceramic coatings further enhance turbine performance by reducing heat transferred into components such as airfoils. The coatings can increase durability of components by minimizing the transfer of heat so as to reduce thermal stress.

A ceramic material can be part of a coating system that provides a thermal barrier on an alloy substrate. Typically the coating system has two layers of differing composition and function. A thin (1–2 mil) bond coat, such as NiCrAlY, is first applied to provide an oxide scale and a strong bond to the thicker (10–20 mil) ceramic coating which is subsequently applied to protect the alloy substrate from high temperature oxidation and thermal shock.

A ceramic material can also be used as a material of construction to form turbine components such as combustor liners and shrouds. These components need to be supported mechanically by superalloy structures. The contact zone between the ceramic material supporting superalloy structure in these applications must be capable of withstanding temperatures of 1100° C. for long periods of time. Also, tight contact at the interface must be maintained under stress induced by vibration and the interface materials must be chemically compatible.

One ceramic material includes a silicon/silicon carbide (Si/SiC) or a silicon/silicon carbide/carbide (Si/SiC/C) material produced by infiltrating carbon fiber prepregs (woven tows of carbon fibers) with molten silicon. The carbon fibers become mostly but not entirely, converted into silicon carbide (SiC). The final material contains silicon carbide (SiC), free silicon (Si) and carbon.

A direct contact zone between silicon-based ceramic material and superalloy does not meet the above-mentioned requirements. Silicon and carbon diffuse across the silicon-based ceramic:superalloy interface causing degradation of the superalloy physical properties. Other complex reactions precipitate brittle silicide and carbide phases within the superalloy and these phases act as sites for initiation and propagation of cracks. Alumina or yttria diffusion barrier coatings have been proposed to address these problems. However, these coatings fail because of thermal mismatch. For example, sputtered yttria coatings on superalloy or on a silicon-based ceramic, fracture and become detached after only a single thermal treating cycle.

There remains a need for a satisfactory diffusion barrier layer between a substrate formed of a superalloy and a silicon-based ceramic material.

SUMMARY OF THE INVENTION

The invention provides a barrier layer that prevents diffusion of silicon and carbon into a superalloy structure. The article of the invention comprises a substrate formed of a superalloy, a silicon-based ceramic material and a thermally stable silicon diffusion barrier layer. The thermally stable diffusion barrier layer lies between superalloy substrate and the ceramic and prevents diffusion of silicon and carbon into the substrate. The diffusion barrier coating is any coating that is thermally stable and that prevents diffusion of silicon or carbon across the ceramic material:superalloy interface.

In another aspect, the invention relates to a method of forming an article, comprising forming a superalloy substrate, applying a thermally stable diffusion barrier layer onto the substrate and applying a silicon-based ceramic material onto the diffusion barrier layer on the substrate, wherein the diffusion barrier layer substantially prevents diffusion of silicon from the ceramic material into the substrate.

DETAILED DESCRIPTION OF THE INVENTION

When alloys containing elements such as nickel, cobalt and chromium are heated in contact with a ceramic material such as a silicon-infiltrated silicon carbide ceramic, which contains free silicon and carbon, a number of reactions are possible at the interface between the alloy and the ceramic. Penetration of silicon into the alloy can result in the formation of stable silicides, such as various nickel suicides (NiSi, $Ni_2Si$) and chromium silicide ($Cr_3Si$). The suicides form numerous eutectic phases, which may be molten at high temperatures.

A marked increase in micro hardness can occur, resulting in alloy subsurface embrittlement. Small amounts of silicon impurity can cause precipitation of brittle Laves phases, which are microcrystalline phases. Also, carbides can form as a result of diffusion of carbon from the ceramic. Excess levels of carbon in the alloy can cause precipitation of brittle sigma phases. The role of silicon in promoting the formation of brittle sigma phase particles in superalloys is described by C. T. Sims et al., *Superalloys II* 1987, J. Wiley, New York, Chapter 8. Sigma phase particles can have a disastrous effect on mechanical properties. For all these reasons, the reactions between a silicon- and carbon-based ceramic and supportive alloy structure at high temperatures present serious problems.

According to the invention, an article is provided that comprises a thermally stable diffusion barrier layer that is intermediate to the combination of a superalloy substrate and silicon-based ceramic material. The barrier layer prevents diffusion of silicon and carbon from the ceramic material into the superalloy substrate.

The superalloy substrate may be a nickel, cobalt or iron based superalloy. Examples of such substrates are Hastelloy®X, Rene®80, IN 738, Ni-20Cr-10Ti alloy, GTD-111, GTD-222, Rene®41, Rene®125, Rene®77, Rene®95, Inconel®706, Inconel®718, Inconel®625, cobalt-based HS188, cobalt-based L-605 and stainless steels. The composition of the invention is especially suited for hardware used in turbines. Examples of a turbine part include a shroud and a combustor liner.

The silicon-based material can comprise a silicon-based ceramic such as silicon carbide (SiC) or silicon nitride ($Si_3N_4$). The ceramic can be a monolith or a composite. A composite can comprise a silicon-based reinforcing fiber, particulate or whisker and a silicon-based matrix. The matrix can be processed by melt infiltration (MI), chemical vapor infiltration (CVI) or other technique. Exemplary silicon-based materials include a monolithic silicon carbide (SiC) or silicon nitride ($Si_3N_4$), a silicon carbide (SiC) fiber-reinforced silicon carbide (SiC) matrix composite, carbon fiber-reinforced silicon carbide (SiC) matrix composite and a silicon carbide (SiC) fiber-reinforced silicon nitride ($Si_3N_4$) composite. The preferred silicon-based material comprises a silicon carbide (SiC) fiber-reinforced silicon/silicon carbide (Si/SiC) matrix composite processed by silicon melt infiltration.

The diffusion barrier coating can be any coating that is thermally stable and that prevents diffusion of silicon or carbon across a ceramic material:superalloy interface. The diffusion barrier coating is typically an oxide such as yttria-stabilized zirconia (YSZ), scandia-stabilized zirconia, calcia-stabilized zirconia, magnesia-stabilized zirconia, yftria, aluminum oxide ($Al_2O_3$), chromium oxide ($Cr_2O_3$) or oxide ($TiO_2$). Alumina silicates such as barium strontium aluminosilicate, calcium aluminosilicate and mullite are also satisfactory barrier coating materials. Yttria-stabilized zirconia (YSZ), mullite, aluminum oxide ($Al_2O_3$), chromium oxide ($Cr_2O_3$) and titanium oxide ($TiO_2$) are preferred barrier coatings. A typical yttria-stabilized zirconia (YSZ) barrier coating comprises about 8 weight percent yttria and 92 weight percent zirconia.

In some instances, the composition of the invention will include a bond coat to assure adhesion. For example, yttria and aluminum oxide ($Al_2O_3$) are utilized with a bond coat to prevent fracture and detachment. The bond coating may be mullite, modified mullite, a nickel or cobalt aluminide, but an MCrAlY alloy is preferred, wherein M is at least one of nickel (Ni), cobalt (Co), iron (Fe) and mixtures thereof. The bond coat's aluminum content will depend upon the type of bond coating alloy chosen for use in the invention. For example, a suitable aluminum content ranges from about 5% by weight for an MCrAlY alloy bond coating to about 40% by weight for an aluminide bond coating.

The respective coatings can be applied to the substrate or to other coatings by any suitable method including thermal spray such as air plasma spray (APS) and vacuum or low pressure plasma spray (VPS or LPPS), high velocity oxy-fuel spray (HVOF), vapor deposition, including chemical vapor deposition (CVD), physical vapor deposition (PVD), electron beam physical vapor deposition (EBPVD) and solution techniques such as sol-gel, slurry coating or colloidal suspension coating.

Typically the layer thickness'es for the bond coatings and barrier coatings are as follows: about 1–2 mils by low pressure plasma spray for MCrAlY as a bond coat on alloy; about 4–5 mils by low pressure plasma spray for titania, chromia or alumina barrier coatings on alloy; about 10 mils by low pressure plasma spray for a mullite barrier coating on ceramic; and about 10–100 microns by pack cementation for nickel aluminide barrier coating on alloy.

The following examples are illustrative of the invention.

A number of alloy materials were investigated and oxide diffusion barriers of different types were applied to the surfaces of either an alloy or silicon-based material. Experiments were carried out at temperatures in the range of about 900–1200° C. for periods of about 50–1600 hours.

EXAMPLE 1

In a first set of experiments, coupons of alloys under investigation (e.g., Hastelloy X), approximately 1×½×⅛ in., were polished on 600 grit silicon carbide (SiC) paper and buffed to a mirror finish. Similarly sized coupons of a silicon-infiltrated silicon/silicon carbide (Si/SiC) composite were polished with 6 micron diamond powder. The alloy and ceramic pieces were pressed together and wrapped tightly with platinum-rhodium wire. The wired specimen assemblies were placed in aluminum boats and heated in air for varying periods of time at a test temperature. The assemblies were then sectioned and interfacial reaction zones were examined by standard metallographic techniques. Such techniques involve mounting specimens in epoxy cement, sectioning across the alloy/ceramic interface, polishing the cut surfaces, examining the cut surfaces in a metallurgical microscope, examining for phases and elements by EDS (energy dispersive spectroscopy) and examining by scanning microprobe analysis. In some cases, the specimens were heated in flowing helium at the test temperature to reduce the extent of oxidation resulting from diffusion of air into the contact zone between the layers.

Figure 1:
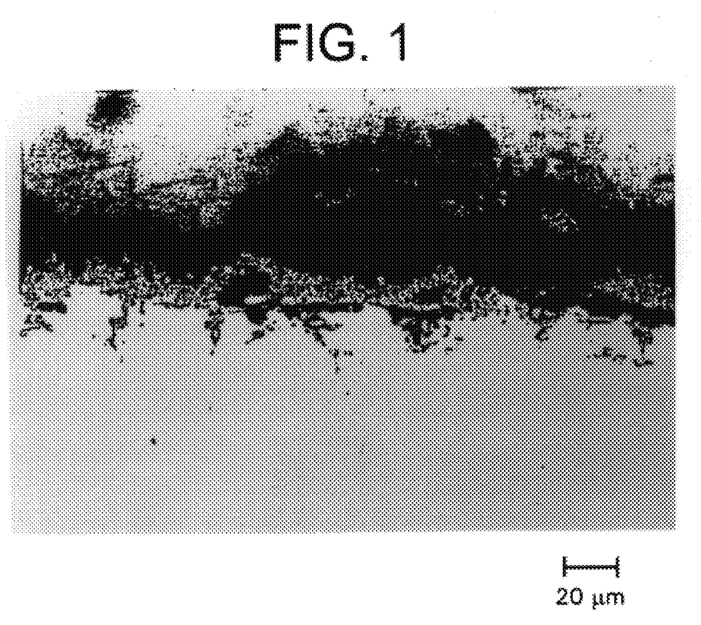
FIG. 1 is a photomicrograph of a section through the surface of a Hastelloy X coupon after contact with a silicon-based ceramic for 500 hours at 900 C.
Figure 2:
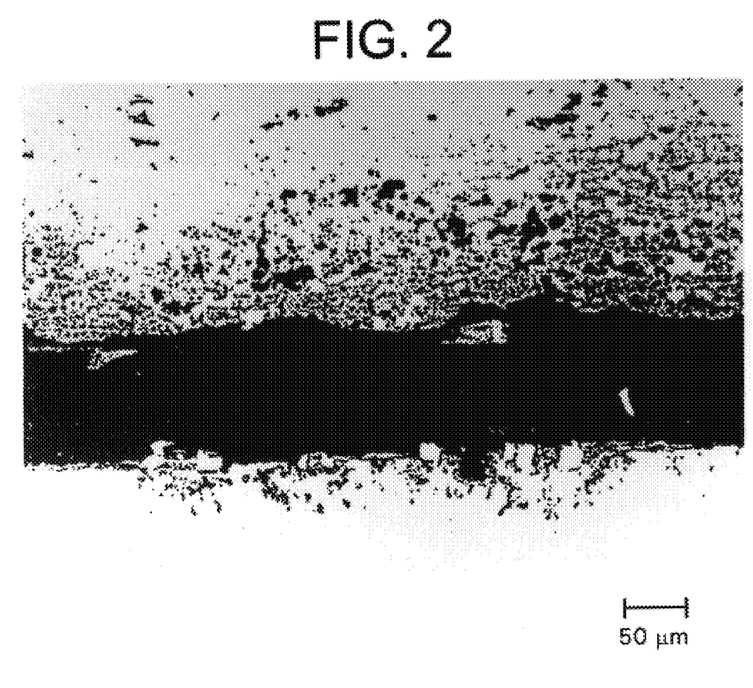
FIG. 2 is a photomicrograph of a section through the surface of a Hastelloy X coupon after contact with a silicon-based ceramic for 100 hours at 1000 C.
Figure 3:
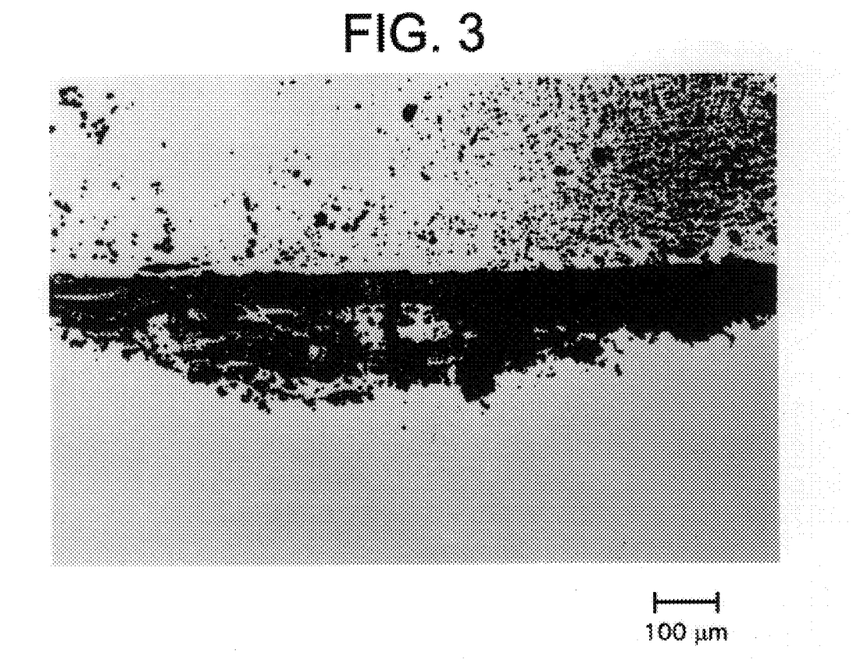
FIG. 3 is a photomicrograph of a section through the surface of a Hastelloy X coupon after contact with a silicon-based ceramic for 672 hours at 1000 C.

Typical reaction zones between the infiltrated silicon/silicon carbide (Si/SiC) composite and Hastelloy X after heating for various times and temperatures are illustrated in FIGS. 1–4. FIGS. 2 and 3 show sections through contact zones of both materials. Voids and precipitates can easily be distinguished by microscopic examination of polished sections of mounted specimens.

Figure 4:
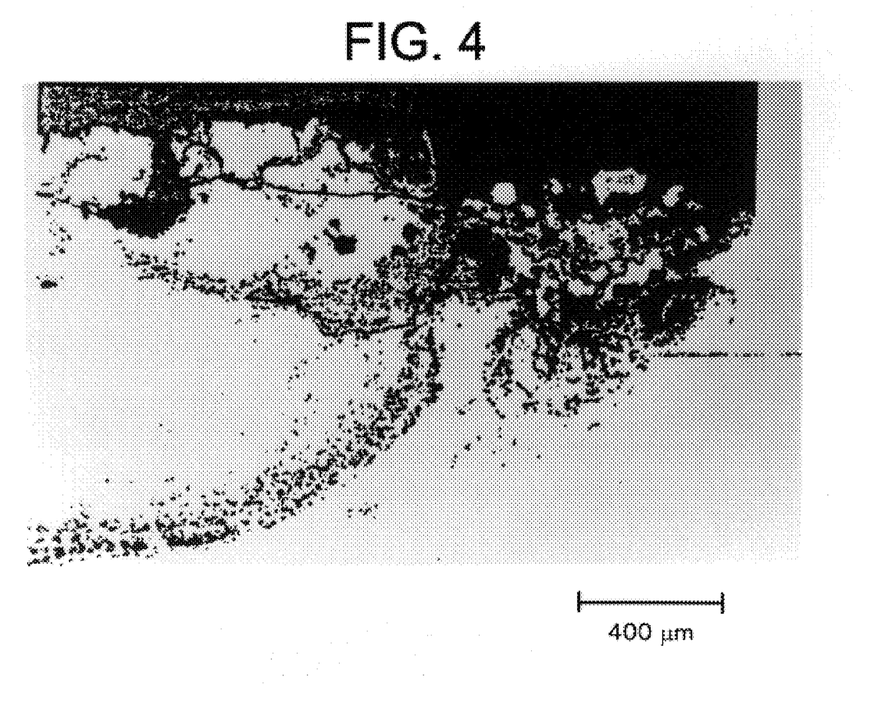
FIG. 4 is a photomicrograph of a section through the surface of a Hastelloy X coupon after contact with a silicon-based ceramic for 120 hours at 1150 C.

Voids are holes whose depth in the surface can be estimated with a travelling microscope. Precipitates are particles with clearly defined boundaries and often regular crystal faces. Diffusion of silicon from the Si/SiC composite resulted in the formation of voids in the ceramic matrix and precipitates within the alloy. At 900° C., the penetration of silicon into Hastelloy X took place to a depth of about 20 microns in 500 hours (FIG. 1) whereas at 1150° C., a reaction zone over 40 mils deep formed in just 120 hours (FIG. 4).

Figure 5:
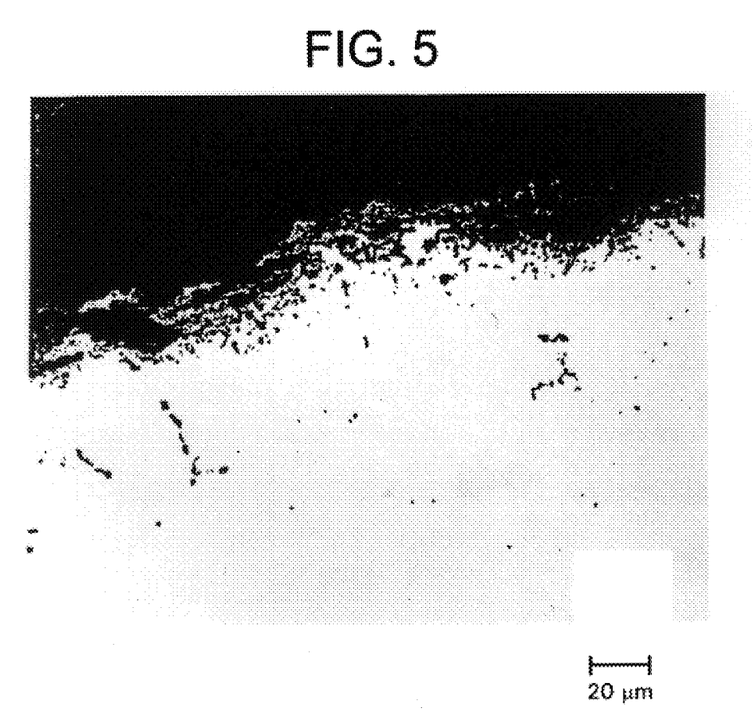
FIG. 5 is a photomicrograph of a section through the surface of a Rene 80 coupon after contact with a silicon-based ceramic for 1000 hours at 900 C.
Figure 6:
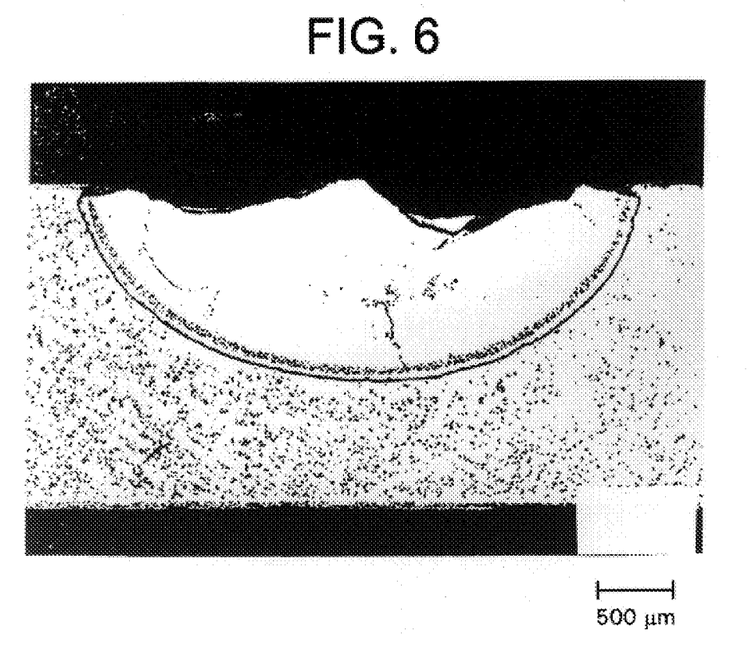
FIG. 6 is a photomicrograph of a section through the surface of a Rene 80 coupon after contact with a silicon-based ceramic for 120 hours at 1150 C.

Rene 80 developed a network of fine silicide particles (FIG. 5) after 1000 hours in contact with a infiltrated silicon/silicon carbide (Si/SiC) composite at 1000° C. However after only 120 hours at 1150° C., a hemispherical reaction zone formed beneath the region of contact with the ceramic (FIG. 6).

Figure 7:
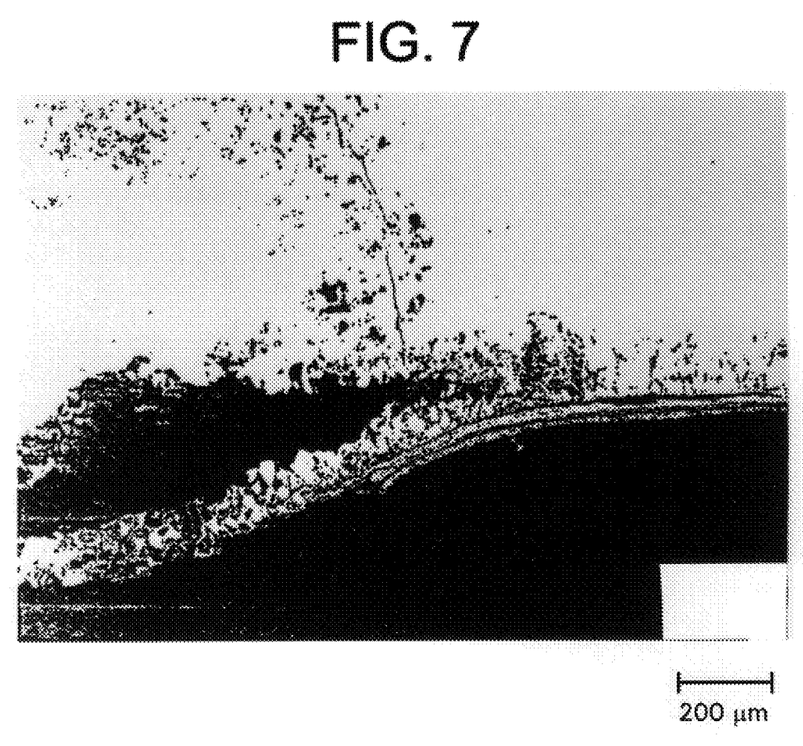
FIG. 7 is a photomicrograph of a section through the surface of a Ni-20Cr-10Ti coupon after contact with a silicon-based ceramic for 140 hours at 1170 C.

The extent of reaction between the ternary alloy Ni20Cr-1OTi and infiltrated silicon/silicon carbide (Si/SiC) composite in 140 hours at 1170° C. is illustrated in FIG. 7.

Figure 8:
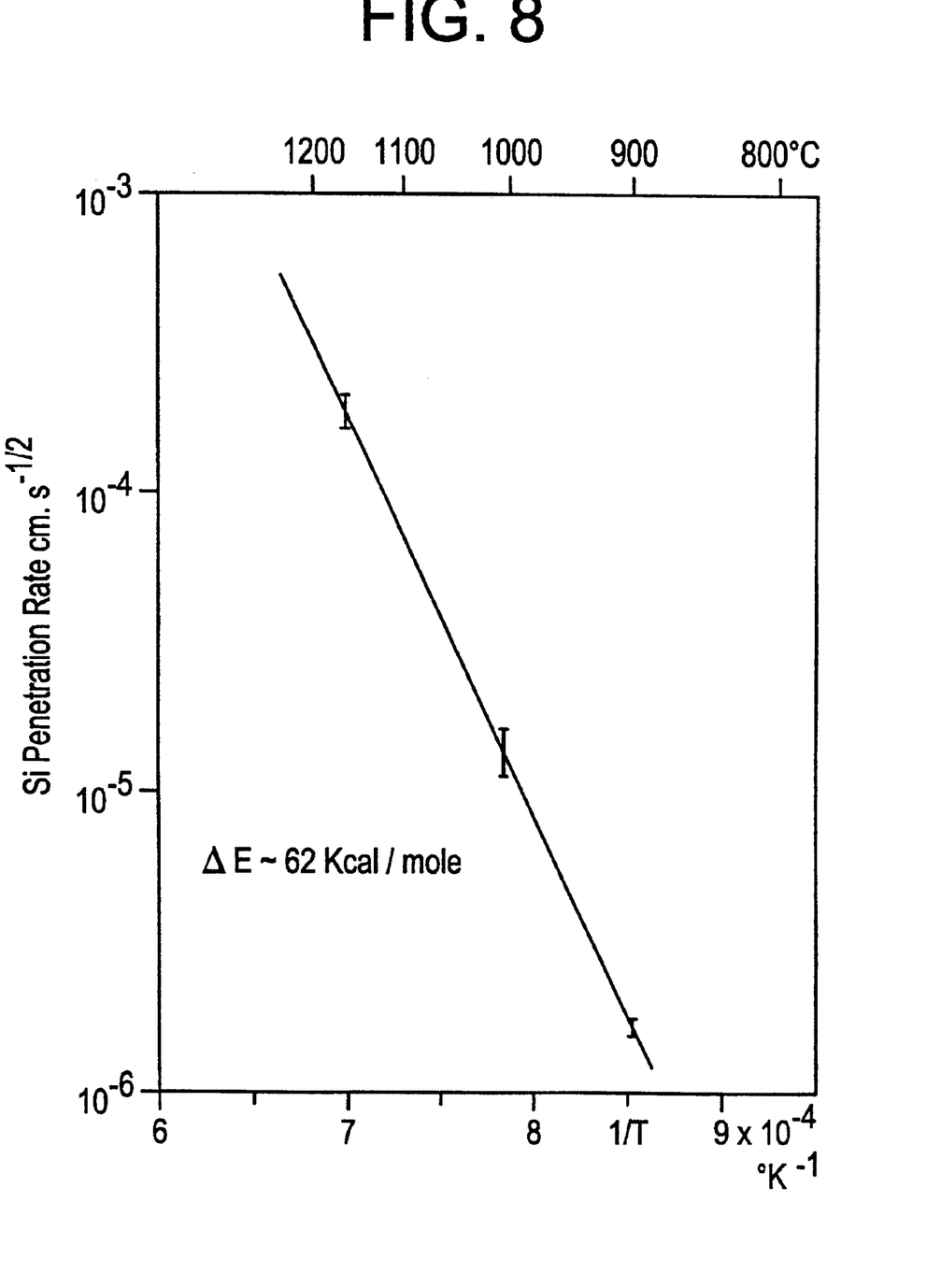
FIG. 8 is an Arrhenius plot of rate of silicon penetration (cm.sec.–½) vs. 1/T K for silicon-based ceramic couples.

For a diffusion controlled process, a plot of penetration depth/(time)½ vs. reciprocal temperature should give a straight line. FIG. 8 shows such a plot, based on the current study, which was used to predict approximate silicon penetration depths at intermediate temperatures. The values agree well with reported values, indicating that the rate of diffusion of silicon is not a strong function of alloy composition.

EXAMPLE 2

Coatings of yttria stabilized zirconia (YSZ), titania ($TiO_2$), chromia ($Cr_2O_3$) or alumina ($Al_2O_3$) were applied to similar alloy coupons to a thickness of 4–5 mils by means of plasma spraying using the low pressure plasma spray process. In these cases, a bond coat of NiCrAlY, 1–2 mils thick was first applied to the metal surface to minimize thermal expansion mismatch between coating and alloy substrate.

Aluminide coatings were deposited on polished rectangular coupons of the nickel-based superalloys IN718, IN738, Rene 80, U-500 and U-700 by the pack cementation process. The alloy coupons were embedded in a powder mixture of composition 5.8% Al, 0.2% NH4F, 94% $Al_2O_3$ (Linde A-10) in a covered retort and heated at 1050° C. for two hours in an atmosphere of argon. During this process, a diffusional coating of dense nickel aluminide —NiAl, 10–100 microns thick, was formed on all surfaces of the alloy coupons. After removal from the powder mixture, the coated coupons were lightly polished to remove adhering alumina particles and then heated in contact with Si/SiC coupons for 120 hours at 1150° C.

Coatings of mullite ($3Al_2O_3.2SiO_2$) c.10 mils thick were also applied to the surfaces of silicon-infiltrated SiC coupons by means of plasma spraying in air.

The oxide coatings were not polished prior to mounting to the coupons and the mullite coating was not polished before placement in contact with the alloy coupons. The efficacy of these oxide layers in reducing the diffusion of free silicon from the Si/SiC composite into the alloy was determined by metallographic examination and EDAX analysis of cut sections of the substrate/material alloy couples after thermal exposure at 900–1200° C.

Figure 9:
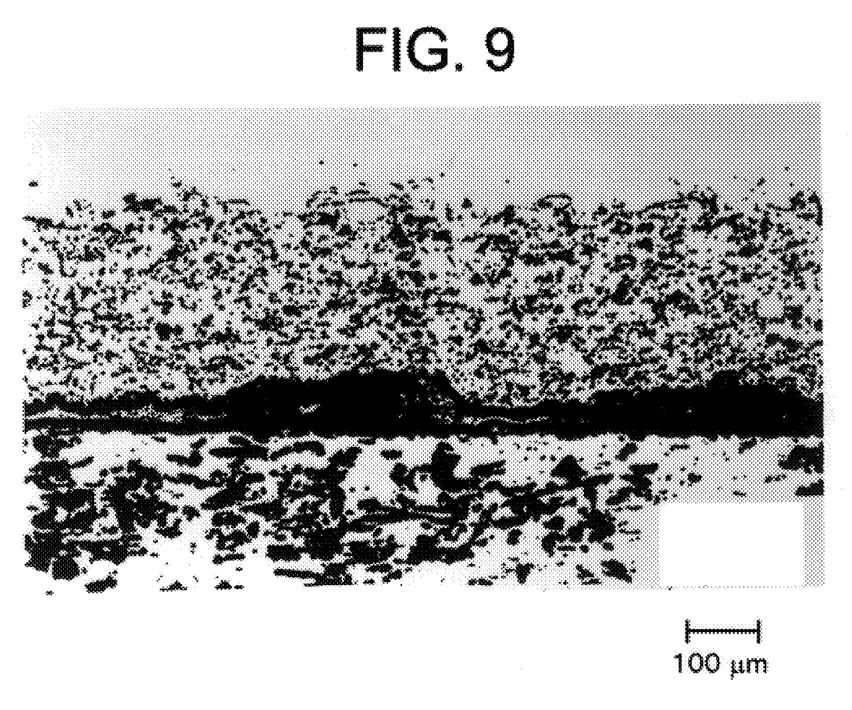
FIG. 9 is a photomicrograph of a section through the surface of an 8% $Y_2O_3.ZrO_2$/NiCrAlY coating on IN 738 after contact with a silicon-based ceramic (lower layer) for 600 hours at 1000° C.
Figure 10:
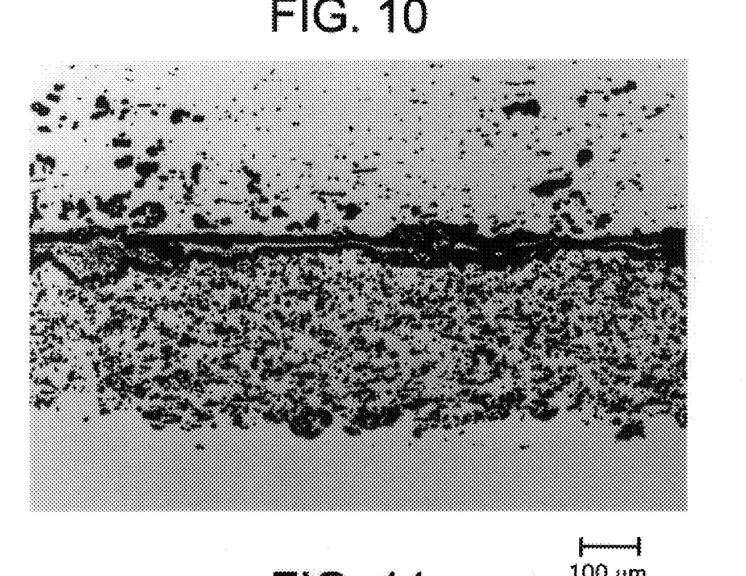
FIG. 10 is a photomicrograph of a section through the surface of an 8% $Y_2O_3.ZrO_2$/NiCrAlY coating on Rene 80 after contact with a silicon-based ceramic (upper layer) for 552 hours at 1000° C.
Figure 11:
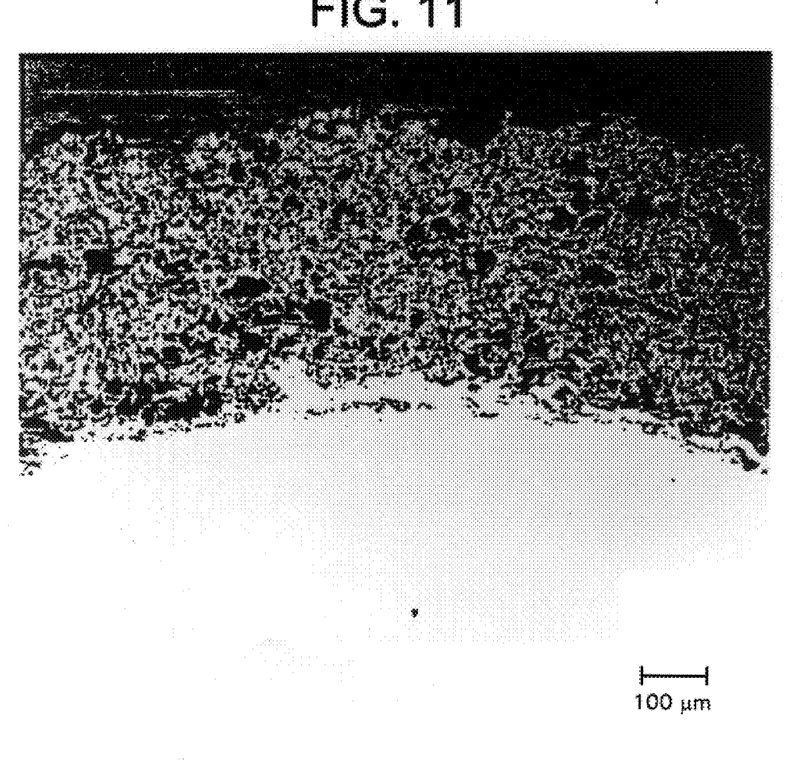
FIG. 11 is a photomicrograph of a section through the surface of an 8% Y2O3.ZrO2/NiCrAlY coating on IN 738 after contact with a silicon-based ceramic for 1004 hours at 900° C. with rapid thermal cycling.

FIG. 9 shows a section through a Si/SiC:YSZ/NiCrAlY/IN738 composite couple after heating for 600 hours at 1000° C. FIG. 10 shows a section through a Si/SiC:YSZ/NiCrAlY/Rene 80 couple after contact for 552 hours at 1000° C. FIG. 11 shows Si/SiC:YSZ/NiCrAlY/IN738 after 1004 hours at 900° C. None of these couples showed evidence of silicon penetration through the material into the alloy substrate.

Figure 12:
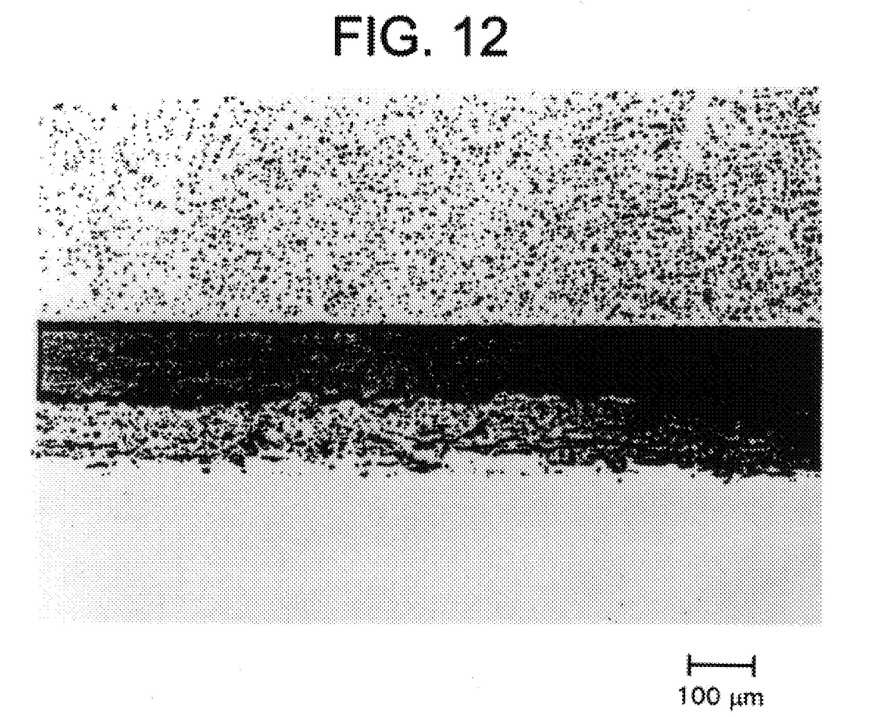
FIG. 12 is a photomicrograph of a section through the surface of an $Al_2O_3$/NiCrAlY coating on Hastelloy X after contact with a silicon-based ceramic (upper layer) for 672 hours at 1000° C.
Figure 13:
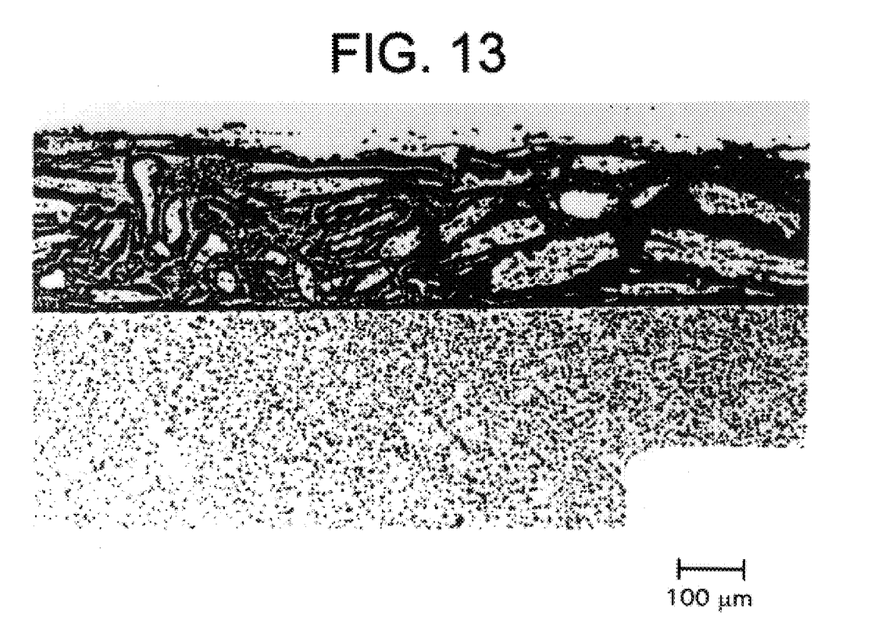
FIG. 13 is a photomicrograph of a section through the surface of a $Cr_2O_3$/NiCrAlY coating on Hastelloy X after contact with a silicon-based ceramic (upper layer) for 672 hours at 1000° C.
Figure 14:
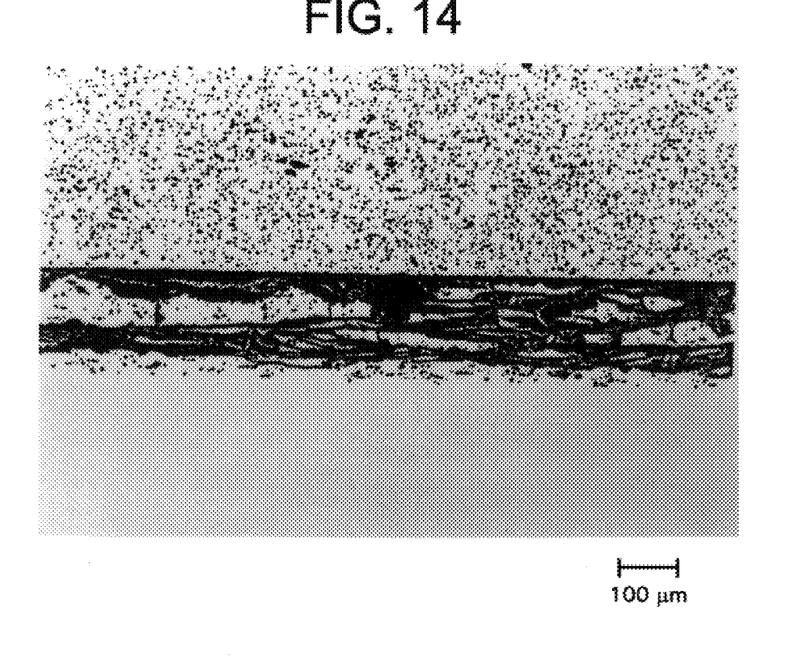
FIG. 14 is a photomicrograph of a section through the surface of a $TiO_2$/NiCrAlY coating on Hastelloy X after contact with a silicon-based ceramic (lower layer) for 672 hours at 1000° C.
Figure 15:
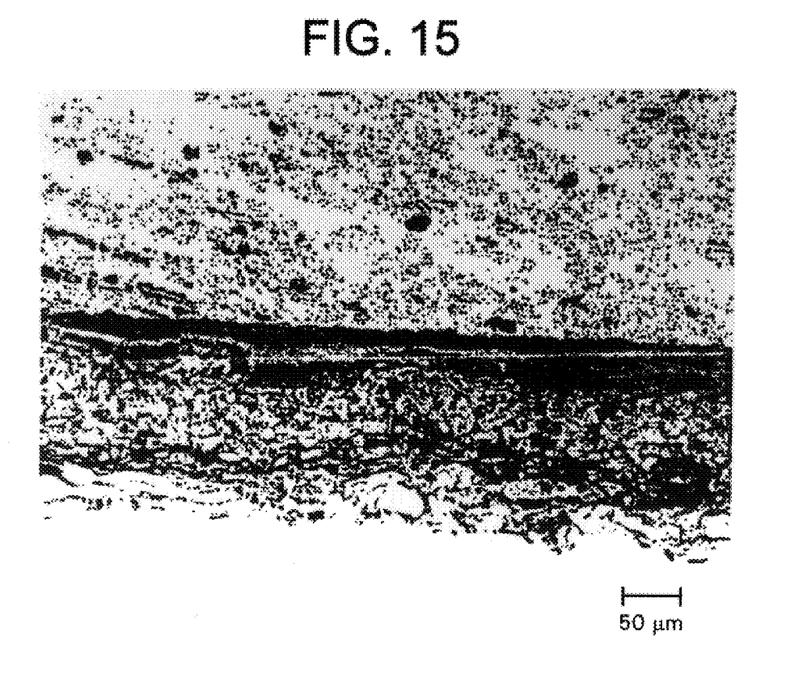
FIG. 15 is a photomicrograph of a section through the surface of an $Al_2O_3$/NiCrAlY coating on Hastelloy X after contact with a silicon-based ceramic (upper layer) for 500 hours at 1100° C.
Figure 16:
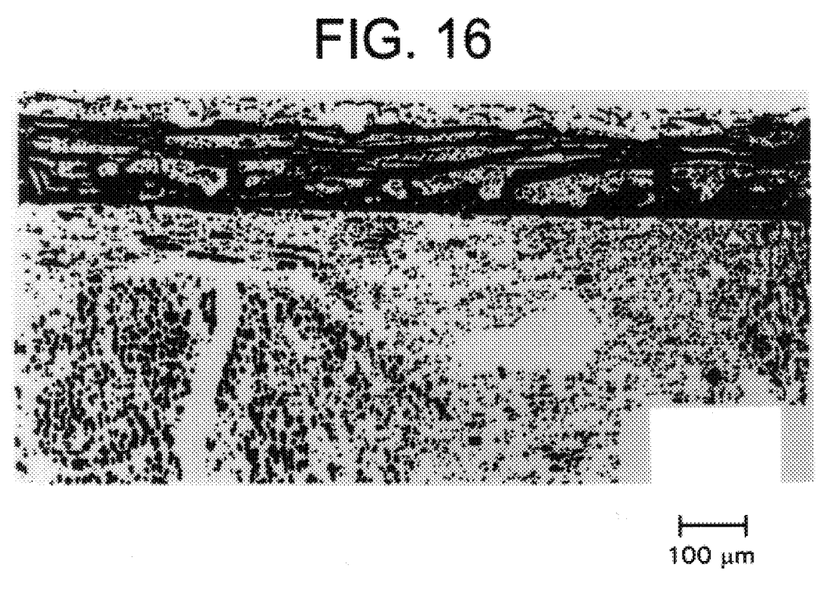
FIG. 16 is a photomicrograph of a section through the surface of a $Cr_2O_3$/NiCrAlY coating on Hastelloy X after contact with a silicon-based ceramic (lower) for 500 hours at 1100° C.
Figure 17:
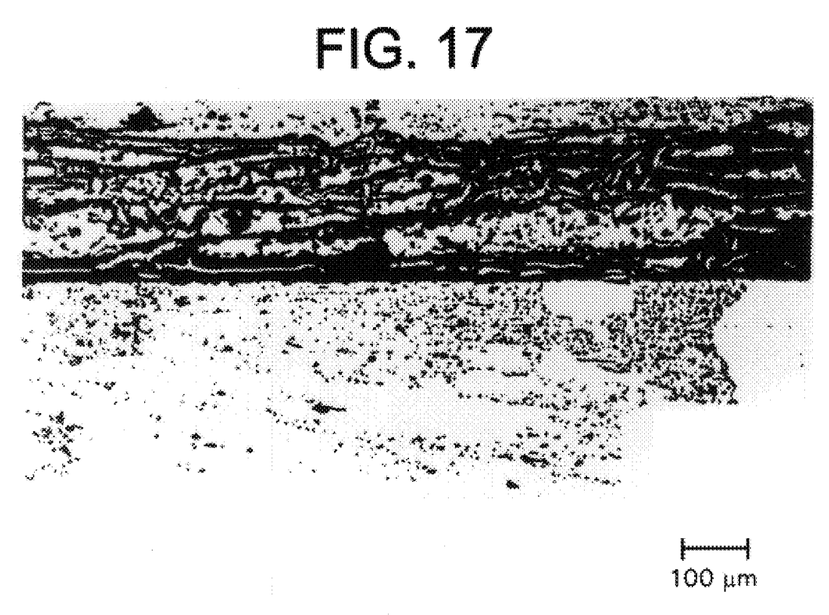
FIG. 17 is a photomicrograph of a section through the surface of a $TiO_2$/NiCrAlY coating on Hastelloy X after contact with a silicon-based ceramic (lower layer) for 500 hours at 1100° C.

The oxides, $TiO_2$, $Cr_2O_3$ and $Al_2O_3$, were also applied over NiCrAlY bond coats to Hastelloy X coupons before heating in contact with Si/SiC composite for extended periods to temperatures of 900, 1000 and 1100° C. FIGS. 12–14 show sections of these Si/SiC composite:oxide/alloy specimens after heating for 672 hours at 1000° C. All three coatings proved effective in preventing diffusion of silicon into the alloy substrate. Sections through $TiO_2$, $Cr_2O_3$ and $Al_2O_3$ couples after heating for 500 hours at 1100° C. are shown in FIGS. 15–17. Again no evidence of silicide formation beneath the coating was found, even though both $TiO_2$ and $Cr_2O_3$ layers shattered on sectioning.

Figure 18:
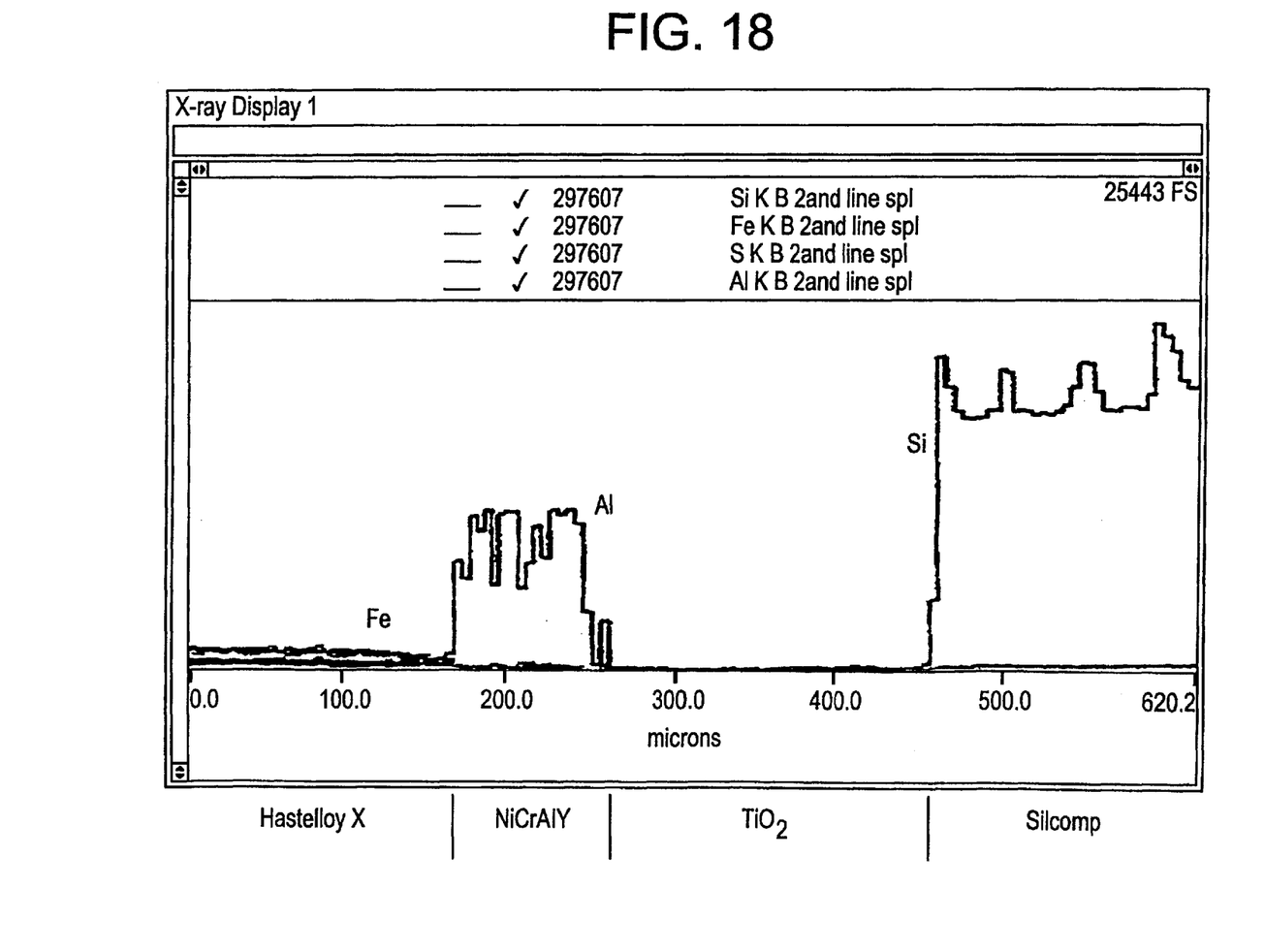
FIG. 18 is an EDS element line scan across the interface between a silicon-based ceramic and a $TiO_2$/NiCrAlY configured Hastelloy X after heating in contact for 1622 hours at 900° C.
Figure 19:
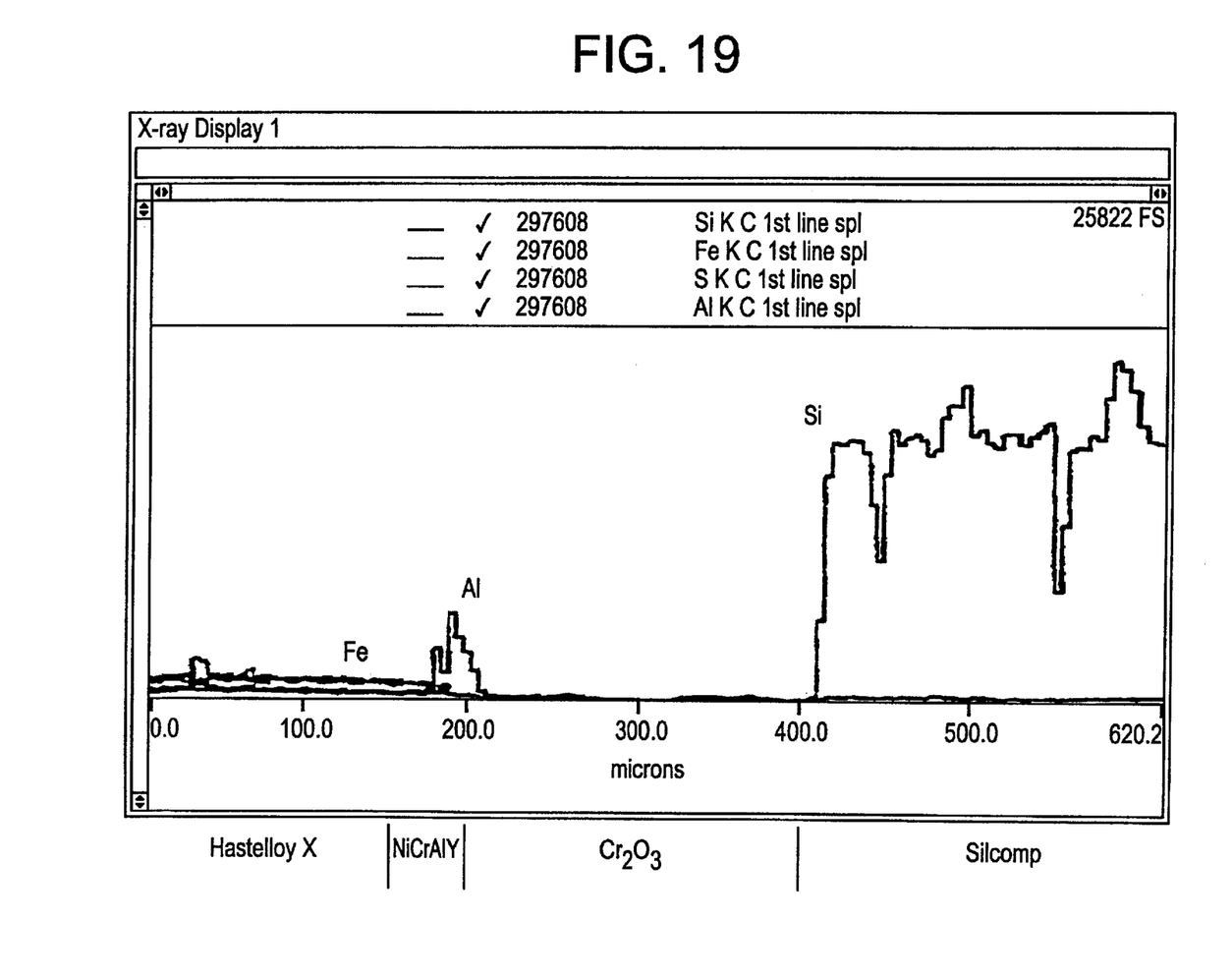
FIG. 19 is an EDS element line scan across the interface between a silicon-based ceramic and a $Cr_2O_3$/NiCrAlY configured Hastelloy X after heating in contact for 1622 hours at 900° C.

FIG. 18 shows an EDS element scan across the interface of a Si/SiC composite:$TiO_2$/NiCrAlY/Hastelloy X couple after 1622 hours heating at 900° C. FIG. 19 shows a scan of a Si/SiC composite:$Cr_2O_3$/NiCrAlY/Hastelloy X couple after the same heating exposure. Neither case showed evidence that silicon had penetrated the oxide coating on the alloy.

EXAMPLE 3

Figure 20:
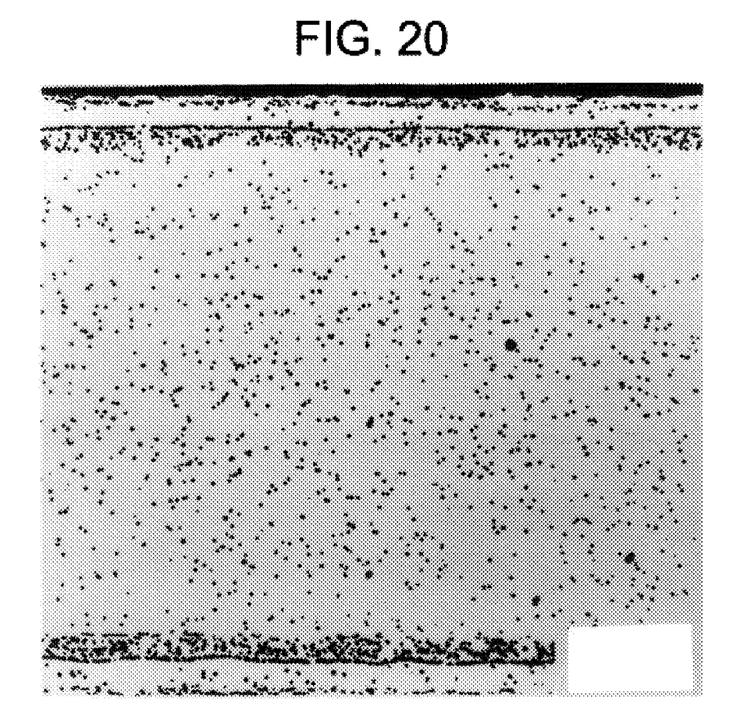
FIG. 20 is a photomicrograph of a section through the surface of a pack aluminided-IN 738 coupon after contact with a silicon-based ceramic for 120 hours at 1150° C.

Aluminide coatings applied to superalloy surfaces by the pack process prevented the formation of brittle silicide phases in alloy coupons on heating in contact with Si/SiC composite. FIG. 20 shows a section through an aluminide coated coupon of IN 738 which was heated in contact with a Si/SiC composite coupon on both sides for 120 hours at 1150° C. A layer of alumina on the aluminided surface of the alloy prevented migration of silicon across the interface.

EXAMPLE 4

Figure 21:
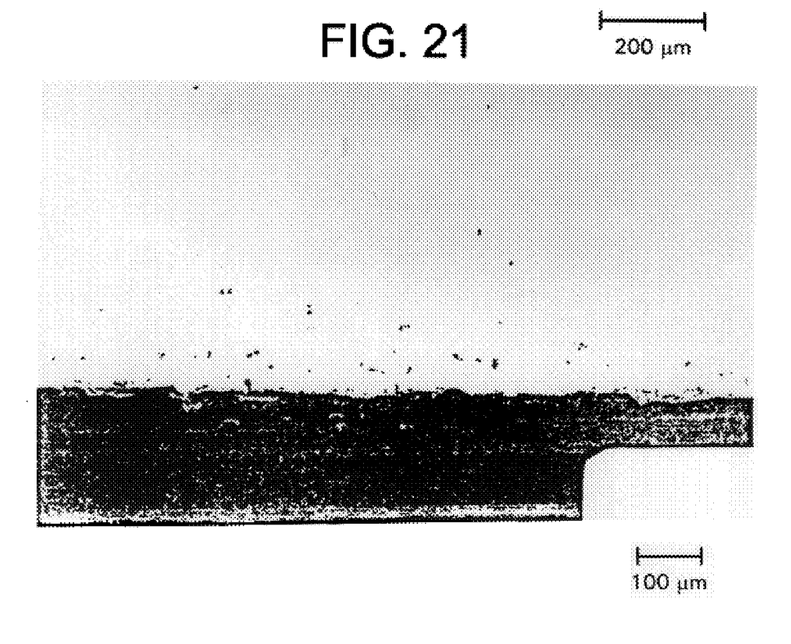
FIG. 21 is a photomicrograph of a section through the surface of a Hastelloy X coupon after contact with a mullite coated silicon-based ceramic for 100 hours at 1100° C.
Figure 22:
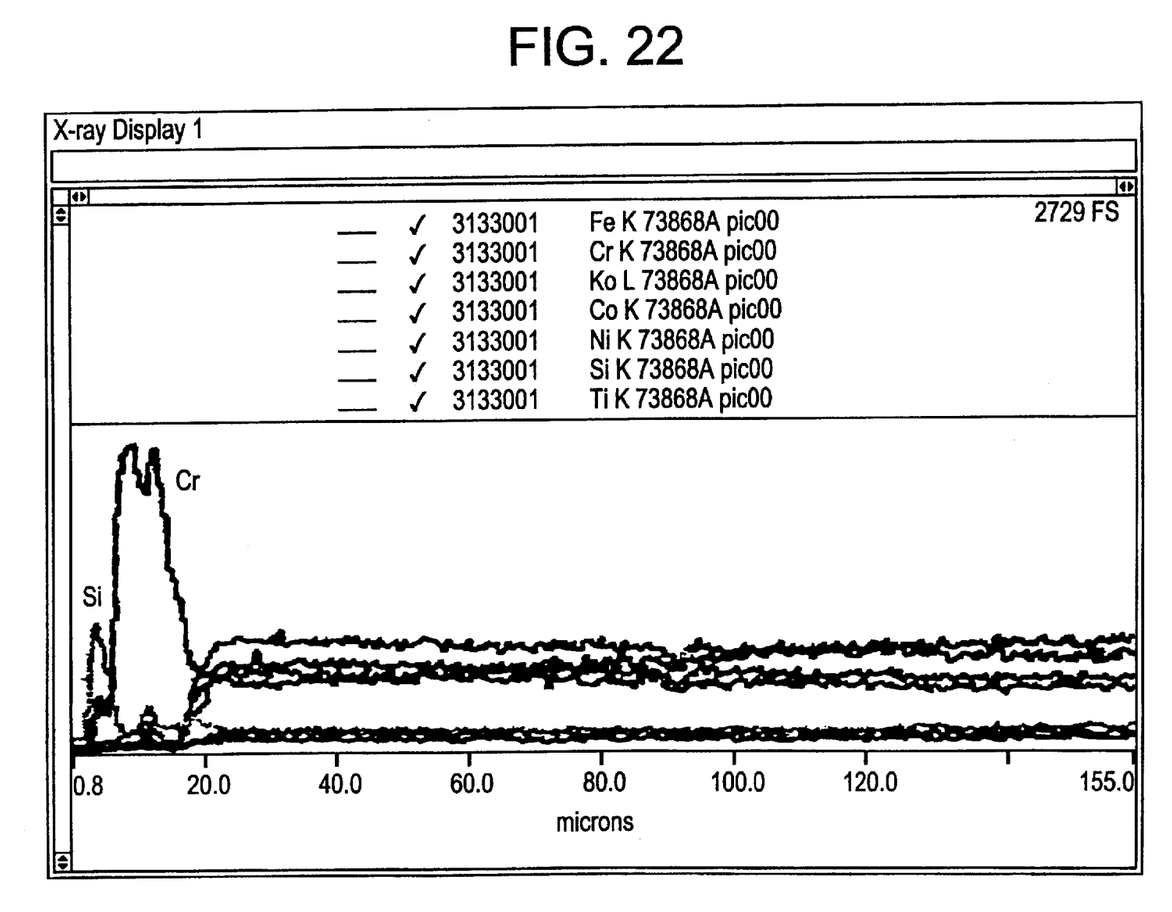
FIG. 22 is an EDS element line scan across into the interior of a Hastelloy X coupon after 100 hours contact with a mullite-coated silicon-based ceramic at 1200° C.

The following example illustrates the application of a mullite barrier layer to a ceramic phase to prevent silicon diffusion across a Si/SiC composite:alloy interface. Mullite ($3Al_2O_3.2SiO_2$) has a very close match in thermal expansion behavior with silicon carbide so as to avoid loss of adherence to the composite during thermal cycling. FIG. 21 shows sections through a Hastelloy X coupon after contact with a mullite coated silicon-based ceramic for 100 hours at 1100° C. Kirkendall voids occur when two metal phases with dissimilar diffusion coefficients are heated in contact. A zone of Kirkendall voids resulting from the diffusion of chromium to the surface is evident in the Hastelloy X coupon. However, energy dispersive spectroscopic analysis (EDS) showed no evidence for penetration of silicon into the alloy. The coating of mullite on the Si/SiC composite coupon remained intact at the conclusion of the experiment. A similar absence of silicon migration was observed when a mullite-coated Si/SiC composite:Hastelloy X couple was heated for 100 hours at 1200° C. FIG. 22 shows an EDS profile beneath the surface of the Hastelloy X coupon. Apart from a small amount of silicon on the surface, no silicon was detected within the alloy.

These Examples show that when superalloy and Si/SiC composite components are heated together at temperatures of 900° C. and above, diffusion of silicon from the ceramic into the metal occurs with the formation of brittle silicides in the alloy (FIGS. 1–7). These embrittlements are detrimental to the properties of alloys used for support structures in combustors and shrouds. The problem can be alleviated by the application of alumina, chromia, titania or yttria-stabilized zirconia diffusion barriers (over a NiCrAlY bond coat) to the alloy surface (FIGS. 9–17). Less fragile diffusion barriers can be obtained by applying mullite to the silicon/silicon carbide (Si/SiC) composite surface before contact with the alloy phase (FIG. 21). A coating of nickel aluminide (NiAl) forms an adherent alumina film on oxidation (FIG. 22), which acts a barrier to silicon diffusion. The invention is effective in preventing migration of silicon into alloy even when the ceramic/alloy couple is heated to 1200° C.

What is claimed:

1. An article, comprising:
   a superalloy substrate;
   a thermally stable diffusion barrier layer; formed on said super alloy substrate and
   a silicon-based ceramic material formed on said diffusion barrier layer selected from at least one of silicon nitride ($Si_3N_4$), silicon carbide (SiC) fiber-reinforced silicon carbide (SiC) matrix composite, carbon fiber-reinforced silicon carbide (SiC) matrix composite, silicon carbide (SiC) fiber-reinforced silicon nitride ($Si_3N_4$) composite or a silicon carbide (SiC) fiber-reinforced silicon/silicon carbide (Si/SiC) matrix composite processed by silicon melt infiltration.

2. The article of claim 1, wherein said thermally stable diffusion barrier layer functions to prevent diffusion of silicon into said superalloy substrate.

3. The article of claim 1, wherein said silicon-based ceramic material contains carbon and said thermally stable diffusion barrier layer functions to prevent diffusion of carbon into said substrate.

4. The article of claim 1, wherein said diffusion barrier layer is an oxide selected from the group consisting of yttria-stabilized zirconia, scandia-stabilized zirconia, calcia-stabilized zirconia, magnesia-stabilized zirconia, yttria, aluminum oxide ($Al_2O_3$), chromium oxide ($Cr_2O_3$) and titanium oxide ($TiO_2$).

5. The article of claim 1, wherein said diffusion barrier layer is an alumina silicate.

6. The article of claim 1, wherein said diffusion barrier layer is barium strontium aluminosilicate, calcium aluminosilicate or mullite.

7. The article of claim 1, wherein said substrate is a nickel, cobalt or iron-based superalloy.

8. The article of claim 1, wherein said silicon-based ceramic material comprises silicon carbide (SiC), silicon nitride ($Si_3N_4$), silicon carbide (SiC) fiber-reinforced silicon carbide (SiC) matrix composite, carbon fiber-reinforced silicon carbide (SiC) matrix composite or silicon carbide (SiC) fiber-reinforced silicon nitride ($Si_3N_4$) composite.

9. The article of claim 1, wherein said silicon-based ceramic material comprises a silicon carbide (SiC) fiber-reinforced silicon/silicon carbide (Si/SiC) matrix composite processed by silicon melt infiltration.

10. The article of claim 1, further comprising a bond coating between said substrate and said diffusion barrier layer to enhance bonding between said substrate and said diffusion barrier layer.

11. The article of claim 10, wherein said bond coating is a nickel aluminide, cobalt aluminide or an MCrAlY alloy, wherein M is at least one of nickel, cobalt, iron or mixtures thereof.

12. The article of claim 10, wherein said superalloy substrate comprises a nickel-based material, said bond coating comprises NiCrAlY, said thermally stable diffusion barrier layer comprises yttria-stabilized zirconia and said silicon-based ceramic material comprises a silicon carbide (SiC) fiber-reinforced silicon/silicon carbide (Si/SiC) matrix composite processed by silicon melt infiltration.

13. The article of claim 10, wherein said superalloy substrate comprises a nickel-based material, said bond coating comprises NiCrAlY, said thermally stable diffusion barrier layer comprises $Al_2O_3$ and said silicon-based ceramic material comprises a SiC fiber-reinforced Si/SiC matrix composite processed by silicon melt infiltration.

14. The article of claim 10 wherein said superalloy substrate comprises a nickel-based material, said bond coating comprises NiCrAlY, said thermally stable diffusion barrier layer comprises chromium oxide ($Cr_2O_3$) and said silicon-based ceramic material comprises a silicon carbide (SiC) fiber-reinforced silicon/silicon carbide (Si/SiC) matrix composite processed by silicon melt infiltration.

15. The article of claim 10, wherein said superalloy substrate comprises a nickel-based material, said bond coating comprises NiCrAlY, said thermally stable diffusion barrier layer comprises $TiO_2$ and said silicon-based ceramic material comprises a silicon carbide (SiC) fiber-reinforced silicon/silicon carbide (Si/SiC) matrix composite processed by silicon melt infiltration.

16. The article of claim 1, wherein said superalloy substrate and said thermally stable diffusion barrier layer comprise and said silicon-based ceramic material comprises a silicon carbide (SiC) fiber-reinforced silicon/silicon carbide (Si/SiC) matrix composite processed by silicon melt infiltration.

17. The article of claim 1, wherein said superalloy substrate comprises a nickel-based material, said thermally stable diffusion barrier layer comprises mullite and said silicon-based ceramic material comprises a silicon carbide (SiC) fiber-reinforced silicon/silicon carbide (Si/SiC) matrix composite processed by silicon melt infiltration.

18. An article of claim 1 comprising an engine part.

19. The article of claim 18, wherein said engine part is a combustor or shroud.

20. A coated superalloy component, comprising:
   a superalloy substrate susceptible to silicon degradation;
   a silicon carbide (SiC) fiber-reinforced silicon/silicon carbide (Si/SiC) matrix composite layer, processed by silicon melt infiltration; and a thermally stable diffusion barrier layer between the substrate and the matrix composite layer, to prevent diffusion of silicon from said matrix composite into said substrates and comprising mullite or yttria-stabilized zirconia.

21. A method of forming an article according to claim 1, comprising:

forming a superalloy substrate, applying a thermally stable diffusion barrier layer onto said substrate and supporting a silicon-based ceramic material on said diffusion barrier layer and said substrate wherein said diffusion barrier layer substantially prevents diffusion of silicon from said ceramic material into said superalloy substrate and where said silicon-based ceramic material is selected from at least one of silicon nitride ($Si_3N_4$), silicon carbide (SiC) fiber-reinforced silicon carbide (SiC) matrix composite, carbon fiber-reinforced silicon carbide (SiC) matrix composite, silicon carbide (SiC) fiber-reinforced silicon nitride ($Si_3N_4$) composite or a silicon carbide (SiC) fiber-reinforced silicon/silicon carbide (Si/SiC) matrix composite processed by silicon melt infiltration.

22. The method of claim 21, further comprising applying a bond coat comprising an MCrAlY alloy onto said substrate to enhance the adherence of said thermally stable diffusion barrier layer to said substrate.

* * * * *